Aug. 18, 1931.  E. R. HIATT  1,819,601
BARROW TRUCK
Filed Jan. 23, 1929  2 Sheets-Sheet 1
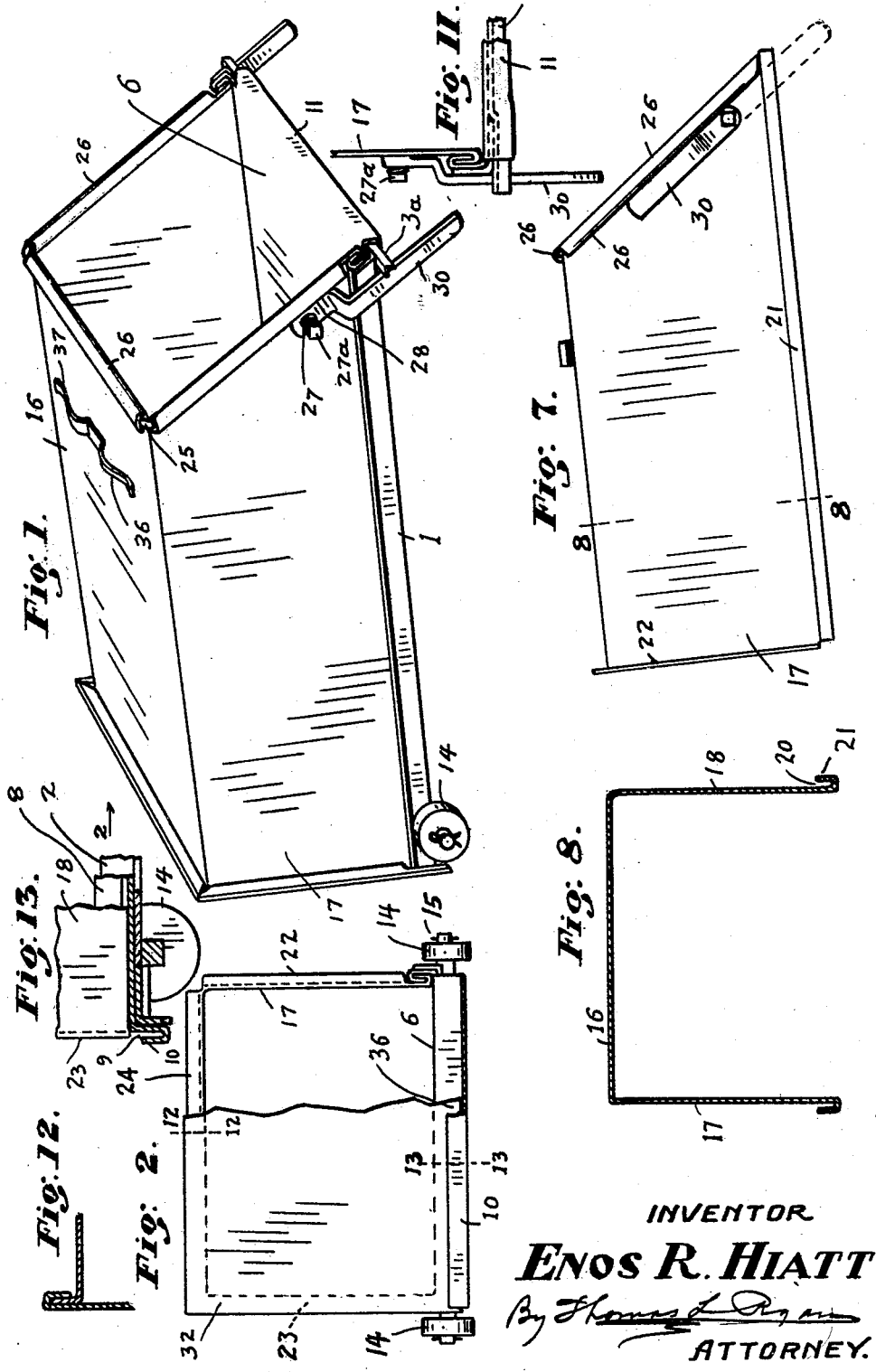
INVENTOR
Enos R. Hiatt
ATTORNEY

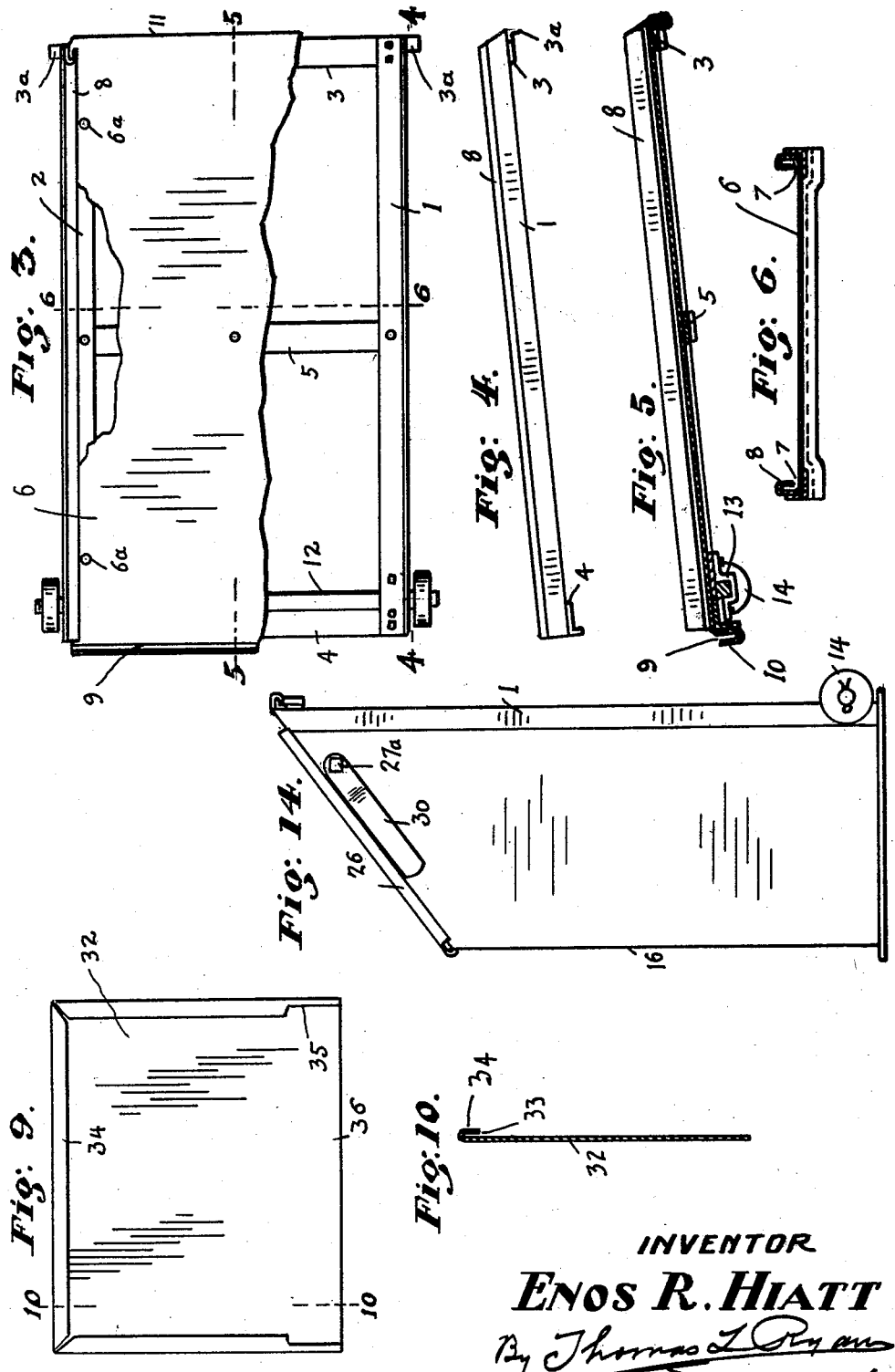

Patented Aug. 18, 1931

1,819,601

UNITED STATES PATENT OFFICE

ENOS R. HIATT, OF WINCHESTER, INDIANA

BARROW TRUCK

Application filed January 23, 1929. Serial No. 334,431.

This invention has reference to improvements in trucks of the barrow type, and which are intended for the transporting, and for convenience in the handling and moving of materials in bulk, such as coal, loose building material, grain, and the like.

Objects of the invention are to provide a device of the kind described which may be easily loaded, and easily moved from one place to another, and which said device while affording easy access for the use of a shovel or other implement for removing the contents, will retain said contents against being accidentally spilled; and which said device may also be used as a storage bin when not needed for service as a truck. Other objects are to provide improved features of construction whereby the making up of the several parts, and the assembling thereof into completed form may be easily accomplished, and the device in its entirety may be strong and durable, and at the same time, relatively light in weight.

The foregoing general objects, and also more specific purposes of my invention, are accomplished by the new construction, combination, and arrangement of parts described in the following specification, and illustrated in the accompanying drawings. The invention is defined in the appended claim. The several parts of the invention, as they appear in the different views in the drawings, are identified by suitable characters of reference.

Figure 1 is a perspective view of my improved barrow truck.

Figure 2 is a view of the forward end of the truck, as seen in the direction of arrow 2 in Figure 1, a portion of the end member being broken away.

Figure 3 is a top plan view of the frame member, (the body member and the end member of the device having been removed) a portion of the frame plate being broken away, disclosing to view the frame side bars and cross bars and their arrangement.

Figure 4 is a side view of Figure 3, taken on the line 4—4 in Figure 3.

Figure 5 is a central longitudinal sectional view taken on the line 5—5 in Figure 3.

Figure 6 is a cross section view taken on the line 6—6 in Figure 3.

Figure 7 is a side view of the body member of the device, the handle members being shown in the folded back or retracted position.

Figure 8 is a cross section view taken on the line 8—8 in Figure 7.

Figure 9 is a reverse view of the end member as shown in Figure 2.

Figure 10 is a vertical cross section view on the line 10—10 in Figure 9.

Figure 11 is an enlarged detached detail view showing the connection between the edge portions of the frame member and the body member.

Figure 12 is an enlarged detached detail view taken on the line 12—12 in Figure 2.

Figure 13 is an enlarged detached detail view in section, taken on the line 13—13 in Figure 2.

Figure 14 is a side view of my improved barrow truck disposed in upright position at rest upon its end member, and in which position the device is capable of being used as a storage container or bin.

This invention contemplates the providing of a container structure, one end of which is closed, wheels journaled at the opposite edges of one side of the closed end of the container, and handle members at the opposite sides of the open end of the container which are so constructed, mounted and retained that they serve as handles for the container when the latter is in the upright position. They are capable of being moved to extended position and in which position they serve as handles for lifting the container from, and as legs supporting the container in, a position inclined downwardly toward its forward end. Features of the invention are the formation of the several members constituting the container, and of the details of connection, whereby the several members are tightly closed at their jointures, and, while capable of being easily united and combined, they so cooperate with each other as to constitute a structure which is economical of manufacture, strong and durable, and is relatively light in weight. Another feature is that the handle members are adapted to serve as legs to support the container in position to be used as a barrow, and to be folded to retracted position so that when the container is disposed on end for use as a bin, the handles occupy out of the way positions.

The invention, as shown in the present embodiment, is of the dimensions and proportions suitable for a barrow truck for use in the furnace and coal room of the ordinary residence or dwelling house. It may be thirty-six inches in length, fifteen inches in height, and twenty inches in width. In the carrying out of the objects of my invention, as shown by the drawings, the device consists of a frame member, a body member, and an end member, there being embodied in the structure of said members, the means of uniting said sections, one to the other.

The frame member of my improved barrow truck comprises similar side bars 1 and 2, angle shaped in cross section, and which are securely retained at spaced distance apart by a cross bar 3, a cross bar 4, and a cross bar 5. A projection 3a on each end of the cross bar 3 performs the function presently to be referred to. The end portions of these cross bars are of offset formation so that the plane of their top surfaces is coincident with the plane of the top faces of the horizontal legs of the said side bars 1 and 2 (see Figure 11). A sheet metal plate, of about number twenty gauge, and which may be designated as the floor plate 6, and which is connected to the side bars and cross bars, by bolts or rivets 6a, or by electrical spot welding, has each of its side edges bent upwardly at a right angle, then upon itself, constituting the space 7 and the lip 8, as shown in Figure 6. The frontal edge portion of said floor plate is bent downwardly at a right angle thence upon itself upwardly, constituting the space 9 and the lip 10, as shown in Figure 5. The rear edge portion of said floor plate is bent downwardly and thence underneath the vertical leg of the cross bar 3, thereby constituting a rounded wearing shield 11, and at the same time reinforcing and bracing the cross bar.

On the machined ends of the axle bar 12 which is secured to the underside of the side bars 1 and 2 near their forward ends by clips 13, wheels 14 and 14 are journaled, and are retained by cotter pins 15.

The body member consists of a sheet metal plate which may be of number twenty-two gauge, and is preferably of U-shaped formation in cross section. This body plate is formed from a blank which is so fashioned, that when it is bent into completed form, the length of the central portion 16 is shorter than the length of the side portions 17 and 18. The edge of each of the said side portions is bent outwardly, thence upon itself, constituting a space 20 and a tongue 21, as shown in Figure 8. The edges of the frontal end of the said body plate are bent at a right angle to constitute flanges 22, 23 and 24. The edges of the rear or diagonal end of said body plate are turned outwardly thence curled or rolled over a stiffening wire 25, constituting a stout rim or bead 26 for the open end of the container.

On each of the sides 17 and 18 of the body plate and at location adjacent to the rim 26, a member which may be designated as a handle is pivotally retained on a fixed stud. A coil spring 27 underneath the cap nut 27a provided on said stud, bears firmly against the shank portion 28 of said handle, and which said shank 28 in turn rests directly against the plate. The body portion of the said handle is bent outwardly and thence in parallelism with the said shank, and constitutes the handle 30, as shown in Figures 1 and 11. This handle while either in the retraced status (as shown in Figure 7) or in the extended status (as shown in Figure 1) has one of the edges of its shank directly in engagement with the underside of the bead 26, the handle thereby being stayed. The force of the spring 27 while serving to hold the handle against being easily shifted from the retracted status, is sufficiently yieldable to permit of the handle being pulled transversely at an incline and thence swung to extended position, or vice versa. This handle while in the retracted position serves the purpose of a handle by which the truck body may be lifted for the purpose of moving same from one place to another. Obviously the length of said handle may be varied in accordance with the height at which it is desired to support the forward end of the truck. The said handle in the extended position, as shown in Figure 1, is in direct engagement with the projection 3a of the cross bar 3, and in this position it serves as a leg upon which the truck body is supported.

The end member or section of my improved barrow truck consists of a sheet metal plate 32 of the suitable proportions as shown in Figures 2 and 10. The upper edge, and each of the side edges is folded upon itself to constitute a space 33 and the lip 34. Offsets 35 which are provided in the lower ends of the said lips afford clearance for the ends of the side bars of the frame section, when the said end section is disposed in place, the straight edge portion 36 being passed into the space 9 of the frontal flange of the frame floor plate.

The several sections just described, are not only capable of being manufactured economically, but they are capable of being easily and effectively coated with finishing material such as paints or enamels. They are also easily capable of economical handling and transportation.

To assemble the several members as just described, and to constitute the device in completed form, the tongues 21 of the body section are disposed in the spaces 7 of the flanges of the frame section. The body section is then shoved longitudinally of the frame section, the ends thereof coming to registration with the ends of the flanges of the frame section. The handles are then swung from the position in which they appear in Figure 7, to the extended position as shown in Figure 1, and in which position they have bearing against the undersides of the projections 3a of the cross bar 3. The next and final step is to then place the end section with its lips 34 in engagement with the flanges 22 and 23 of the body plate. The said end section is then shoved downwardly, the lips 34 engaging the said flanges 22 and 23, and the top flange 24, and the space 9 of the front end of the floor plate of the frame section.

The several members so united as described, are preferably secured together by spot welding. In instances however where the sections are shipped to destination in knocked down condition they are to be secured together by small bolts or rivets applied at the several flanges. By the construction, combination and arrangement of parts just described, there is provided a container which is stable and durable, and which is suitable for the reception and retention of materials of all kinds. On the central portion 16 of the body plate, there is secured a spring clamp bar having the free ends 36 and 37, which are serviceable in holding such implements as the operator may have use for, such as a shovel, and a pair of gloves.

The especial use for which this invention is intended, is for facilitating the work of handling and transporting the coal in the house basement, from the source of supply to the furnace door. For such use, the handles are moved to extended position and the truck is disposed at the lowered status, and at position suitably adjacent to the coal supply, whence the desired quantity of coal is shoveled into same. With a grasp of the handles the operator is able to easily roll the truck with its load, to position immediately adjacent to the furnace. At this position the handles function as legs which support the container at a plane inclined downwardly toward its forward end. The quota of coal needed for stoking the furnace is then easily removed, the shovel being operable freely on the floor plate 6. For the quotas of coal needed for subsequent stoking, there is sufficient supply in the truck and which may remain at its position adjacent the furnace until the supply has been exhausted. My improved barrow truck is of useful advantage in other instances too numerous to mention where it is desired to handle, transport, and rehandle, bulk material, such as coal, sand and gravel, grain, fruit and vegetables; in fact all kinds of bulk materials necessary to be handled, transported, and rehandled, about the shop, factory or the home.

If it may be desired to lower the forward end of the truck to the ground for the purpose of emptying or cleansing, the handles are folded back to the position as shown in Figure 7. In this folded back position they serve solely as handles and by which the user is enabled to move the device as a bin, in such direction as may be desired. To use the truck as a storage bin it is simply disposed on end, as shown in Figure 14, the handles being in the folded back, out of the way status. On account of the relatively low cost at which the barrow truck, made in accordance with my invention, may be manufactured and supplied to the user, the device is considered of material utility and usefulness to the warehouse owner, and the stock departments of businesses of many kinds.

Whereas in the present specification and illustration of my invention I have shown it embodied in a truck of medium size, and intended for use where comparatively light service is required, it will be understood that the invention may be practiced in trucks of various sizes, proportions and capacities. Also I wish it to be understood that minor modifications and changes may be made in the features of construction, within the range of the invention as it is defined in the appended claim, without departing from the spirit of the invention or sacrificing any of its advantages.

What I claim as my invention is—

A device of the kind described, comprising a frame section provided with a floor plate having side flanges of hook shaped formation in cross section, there being a grooved flange at the front end, and a transverse rod at the rear end and whose ends project beyond the edges of the said floor plate, wheels journaled at the forward end of said frame section, a body member which is substantially U-shaped in cross section the edges of which are of hook shaped formation in cross section to slidably engage the flanges of the frame section, and the front end of said body member being flanged, an end section having lateral grooved flanges to engage the front flanges of the body member and an edge portion to engage the grooved flange of the frame section, and handle members retained yieldingly on the sides of the rear portion of the body member and which are adapted to be swung to or from engagement with the end portions of the aforesaid transverse rod of the said frame section.

In testimony whereof I affix my signature.

ENOS R. HIATT.